US008980458B2

(12) United States Patent
Honjo et al.

(10) Patent No.: US 8,980,458 B2
(45) Date of Patent: Mar. 17, 2015

(54) BATTERY CASING

(75) Inventors: Hideki Honjo, Okazaki (JP); Weng Leong Loo, Chiryu (JP); Masanori Inagaki, Nagoya (JP); Seiichi Takasaki, Okazaki (JP); Takanori Yamamoto, Toyota (JP); Takeshi Fujii, Okazaki (JP)

(73) Assignees: Mitsubishi Jidosha Kogyo Kabushiki Kaisha, Tokyo (JP); Mitsubishi Jidosha Engineering Kabushiki Kaisha, Aichi (JP)

( * ) Notice: Subject to any disclaimer, the term of this patent is extended or adjusted under 35 U.S.C. 154(b) by 93 days.

(21) Appl. No.: 13/292,148

(22) Filed: Nov. 9, 2011

(65) Prior Publication Data
US 2012/0156539 A1 Jun. 21, 2012

(30) Foreign Application Priority Data

Dec. 15, 2010 (JP) ................................. 2010-279703

(51) Int. Cl.
*H01M 2/10* (2006.01)
*B60K 1/04* (2006.01)
*H01M 10/0525* (2010.01)

(52) U.S. Cl.
CPC .............. *H01M 2/1083* (2013.01); *B60K 1/04* (2013.01); *H01M 10/0525* (2013.01); *Y02T 10/7011* (2013.01); *B60K 2001/0438* (2013.01)
USPC ............................................. 429/100; 429/96

(58) Field of Classification Search
CPC ............ B60K 1/04; B60K 2001/0438; H01M 2/1083; H01M 10/0525; Y02E 60/12; Y02T 10/7011

USPC .......................................................... 429/100
See application file for complete search history.

(56) References Cited

U.S. PATENT DOCUMENTS

| 5,392,873 | A | * | 2/1995 | Masuyama et al. | ........... 180/68.5 |
|---|---|---|---|---|---|
| 2008/0190679 | A1 | * | 8/2008 | Sato et al. | ..................... 180/68.5 |
| 2009/0236162 | A1 | * | 9/2009 | Takasaki et al. | ............. 180/68.5 |
| 2009/0242299 | A1 | * | 10/2009 | Takasaki et al. | ............. 180/68.5 |

(Continued)

FOREIGN PATENT DOCUMENTS

| EP | 1 950 070 A1 | 7/2008 |
|---|---|---|
| EP | 2 207 224 A1 | 7/2010 |
| JP | 2010-153130 A | 7/2010 |

OTHER PUBLICATIONS

European Search Report dated Mar. 28, 2012.

*Primary Examiner* — Gary Harris
(74) *Attorney, Agent, or Firm* — Birch, Stewart, Kolasch & Birch, LLP

(57) ABSTRACT

A battery casing for receiving a battery for driving an electric vehicle, including: a tray member made from a resin and supporting the battery; a support member provided under a lower face of the tray member and supporting the tray member from a bottom thereof; a standing wall provided so as to stand in the tray member; and a sheet metal tray member made from a sheet metal and placed on the tray member. The sheet metal tray member includes a plurality of sheet metal recesses that receive the battery and a sheet metal flange placed on an upper face of the standing wall. The standing wall includes a through hole formed through the standing wall in a standing direction of the standing wall. The support member and the sheet metal flange are fastened to the tray member by a sheet metal fastening member provided through the through hole.

8 Claims, 5 Drawing Sheets

(56) References Cited

U.S. PATENT DOCUMENTS

2010/0190044 A1* 7/2010 Nishino et al. ............... 429/120
2011/0143179 A1* 6/2011 Nakamori ...................... 429/99

* cited by examiner

BATTERY CASING

CROSS-REFERENCE TO THE RELATED APPLICATION

This application incorporates by references the subject matter of Application No. 2010-279703 filed in Japan on Dec. 15, 2010 on which a priority claim is based under 35 U.S.C. §119(a).

BACKGROUND OF THE INVENTION

1. Field Of The Invention

The present invention relates to a battery casing for receiving battery modules for an electric vehicle.

2. Description Of The Related Art

A battery unit used for an electric vehicle typically includes multiple battery modules and a battery casing that receives the battery modules. One type of structure of a battery casing includes a tray member that supports battery modules and a cover member that covers the top of the tray member, as disclosed in Japanese Laid-open Patent Publication No. 2010-153130 (JP 2010-153130 A). In this structure, the tray member and the cover member are coupled together by means of multiple bolts and nuts at the joint part between the periphery of the tray member and the periphery of the cover member.

The tray member included in the battery casing disclosed in JP 2010-153130 A is provided with partitioning walls extending in the width direction for dividing the tray member in the longitudinal direction, and separation walls (ribs) extending in the front-rear direction for dividing the tray member into multiple compartments. The multiple battery modules are placed into the respective sections separated by the partitioning walls and the separation walls and are secured therein.

For a larger battery casing that receives larger-capacity battery modules, a higher stiffness is required so as to withstand the weight of the battery modules. As disclosed in JP 2010-153130 A, such a battery casing is made from a fiber reinforced plastic (FRP) having the electric insulation property, and separation walls are provided to the tray member that supports the battery modules, for securing the battery modules, as well as enhancing the stiffness of the casing.

For a tray member made from a fiber reinforced plastic, in order for the separation walls provided in the tray member to secure sufficient stiffness required for the battery casing, the separation walls must be formed thicker. However, forming thicker separation walls means reduced space for receiving the battery modules on the tray member.

SUMMARY OF THE INVENTION

The present invention was conceived of in view of the above issue, and an object thereof is to provide a battery casing which can enhance the stiffness of the battery casing, while providing sufficient space in a tray member.

In order to solve the above-described issue, a battery casing of the present invention is a battery casing for receiving a battery for driving an electric vehicle including: a tray member made from a resin and supporting the battery; a support member provided under a lower face of the tray member and supporting the tray member from a bottom thereof; a standing wall provided so as to stand in the tray member; and a sheet metal tray member made from a sheet metal and placed on the tray member.

Furthermore, the sheet metal tray member includes a plurality of sheet metal recesses that receive the battery and a sheet metal flange section placed on an upper face of the standing wall.

Furthermore, the standing wall includes a through hole formed through the standing wall in a standing direction of the standing wall.

In addition, the support member and the sheet metal flange are fastened to the tray member by means of a sheet metal fastening member provided through the through hole.

It is preferred that the standing wall is a partitioning wall extending in a transverse direction of the tray member and provided in a center portion in the longitudinal direction, or a surrounding wall at the ends in the longitudinal direction of the tray member.

Furthermore, it is preferred that the battery includes a battery flange placed on the upper face of the standing wall, the support member and the battery flange are fastened to the tray member by means of a battery fastening member provided through the through hole, and the sheet metal fastening member and the battery fastening member are arranged side by side.

In the above configuration, it is more preferred that the sheet metal fastening member and the battery fastening member each include a through nut inserted in the through hole and a bolt, and the support member and the sheet metal flange, and the support member and the battery flange are fastened to the tray member once the bolt is screwed with the through nut from the upper face of the standing wall and the lower face of the tray member.

In accordance with the battery casing of the present invention, a sheet metal tray member is placed on a resin tray member that supports the battery. The sheet metal flange is provided on the upper face of the standing wall of the tray member, and the support member is provided under the lower face of the standing wall. In other words, the standing wall of the tray member is sandwiched between the sheet metal flange and the support member, and the sheet metal flange and the support member are fastened to the standing wall of the tray member by means of the sheet metal fastening member. Accordingly, the stiffness of the standing wall is enhanced, thereby enhancing the stiffness of the entire battery casing. Thus, the thickness of the standing wall provided so as to stand on the tray member can be reduced, which helps to increase the space for receiving the battery. As described above, the battery casing of the present invention is more suitable as a casing for large-capacitance batteries since the stiffness is enhanced and space for receiving the batteries is increased.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

Hereinafter, an embodiment will be described with reference to the drawings. Note that the embodiment described below is described by way of example only, and various modifications and applications of techniques that are not shown explicitly in the embodiment illustrated below are not intended to be excluded.

The structure of a battery casing according to the present embodiment will be described with reference to FIGS. 1 to 5. This battery casing is adapted to receive battery modules (battery) for driving an electric vehicle, including a hybrid electric vehicle. Hereinafter, the traveling direction of the electric vehicle is referred to as "front", and "left and "right" are defined with respect to the front. In addition, the direction of the gravity is referred to as "below", whereas the direction opposing to below is referred to "above". In addition, the direction toward the center of the battery casing is referred to as "inner", whereas the direction opposing to inside is referred to "outer".

Figure 5:
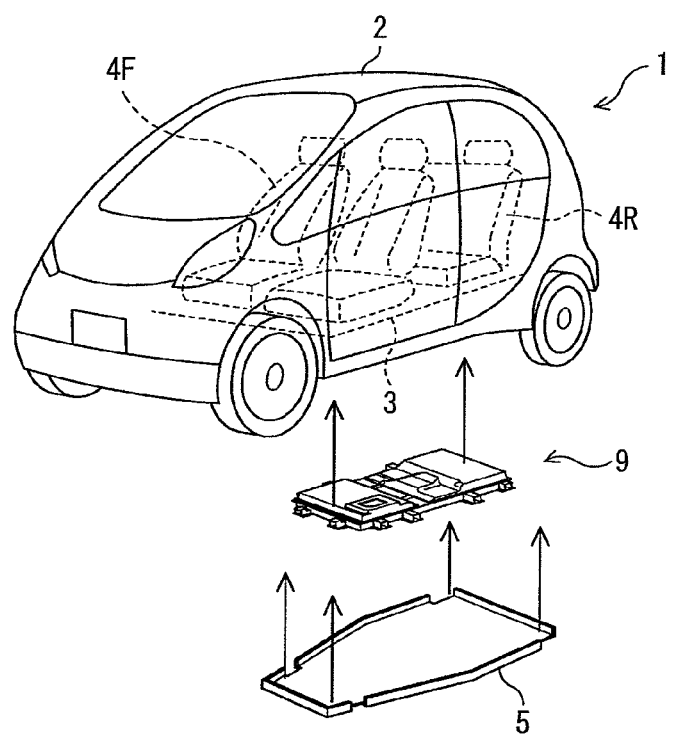
FIG. 5 is a schematic exploded perspective view illustrating how a battery unit with the battery casing according to an embodiment is mounted.

As shown in FIG. 5, an electric vehicle 1 includes a motor and a recharger (both not shown) for driving the vehicle, which are placed at the rear side of a vehicle body 2, and a battery unit 9 placed under the floor of the vehicle body 2 or the like. A floor panel 3 is provided above the battery unit 9, and front seats 4F and rear seats 4R are placed above the floor panel 3, i.e., in the cabin.

The floor panel 3 is formed from a sheet metal, for example, and extends in the front-rear and left-right directions of the vehicle body 2, thereby defining the floor of the vehicle body 2. The floor panel 3 is secured by weld or the like at predetermined positions of the frame structure, including a side member (not shown) which constructs the vehicle body 2. The battery unit 9 is placed below the floor panel 3, i.e., under the floor outside the vehicle body 2, spaced apart from the floor panel 3. An under cover 5 is provided below the battery unit 9, and is secured to the frame structure or the like. The battery unit 9 includes multiple battery modules 8, electronic components (not shown), and the like, in a battery casing 7 accommodated therein. The battery modules 8 to be received in the battery casing 7 are illustrated with the chain double-dashed lines in FIG. 1.

The fundamental structure of the battery casing 7 will be described.

Figure 3:
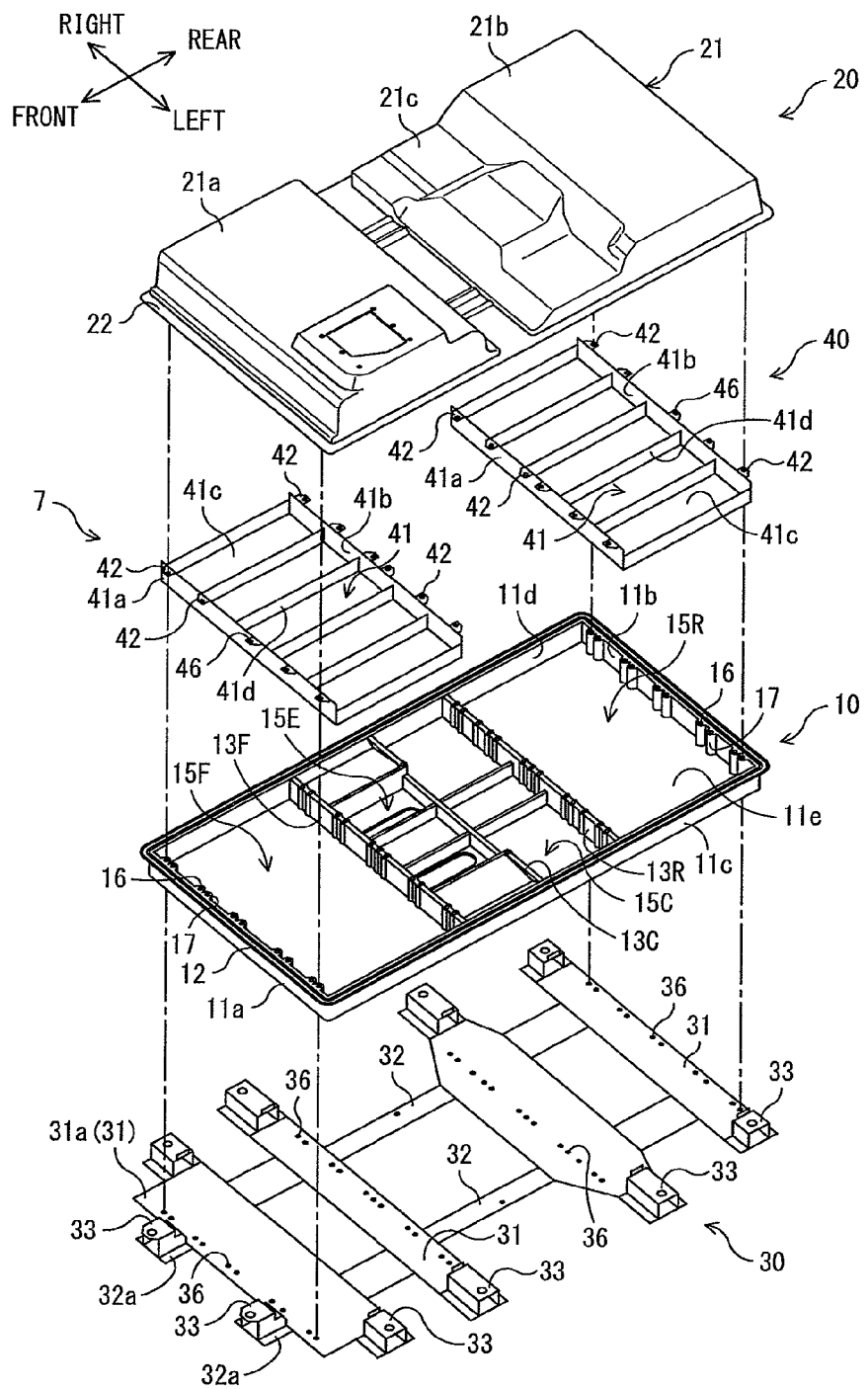
FIG. 3 is a schematic exploded perspective view illustrating the structure of the battery casing according to an embodiment.

As shown in FIG. 3, the battery casing 7 is configured to include a tray member 10 made from a resin for supporting the multiple battery modules 8, a cover member 20 made from a resin which is stacked on the tray member 10 and is coupled and secured to the tray member 10, a support member 30 provided under the lower face of the tray member 10 for supporting the tray member 10 from its bottom, and sheet metal tray members 40 made from sheet metals and placed on the tray member 10.

The battery modules (battery) 8 are an array of battery cells configured from lithium-ion batteries and connected together in series. The tray member 10 and the cover member 20 are formed from a fiber reinforced plastic (FRP), for example, to which fibers, such as glass fibers, are added as a reinforcing material for improving the strength and the stiffness, as well as for providing the electrical insulation property. The support member 30 is made from a metal material (e.g., a steel sheet) having a strength sufficient to withstand the load of the entire battery casing 7. The sheet metal tray members 40 are formed by bending and/or welding sheet metals.

The tray member 10 includes a front wall 11a, a rear wall 11b, a pair of left and right side walls 11c and 11d, and a bottom wall 11e, defining a box shape having an open top. Note that the front wall 11a, the rear wall 11b, and the side walls 11c and 11d, which are walls of the tray member 10 formed so as to stand, are also referred to as the standing walls. The front wall 11a is located at the front side of the vehicle body 2, while the rear wall 11b is located at the rear side of the vehicle body 2, the front wall 11a and the rear wall 11b extending in the transverse direction of the tray member 10 (i.e., width direction) at the ends in the longitudinal direction of the tray member 10. The side walls 11c and 11d extend in the front-rear direction, the front wall 11a, the rear wall 11b, and the side walls 11c and 11d defining a surrounding wall 11 of the tray member 10. As used herein, the term "front-rear direction" refers to the longitudinal direction of the tray member 10, whereas the term "left-right direction" refers to the transverse direction (width direction) of the tray member 10.

A tray-side flange 12 is provided around the periphery of the upper end of the surrounding wall 11 of the tray member 10, so as to outwardly protrude from the upper end of the surrounding wall 11 and extend in the horizontal direction. This tray-side flange 12 is provided continuously around the entire periphery of the tray member 10. The tray-side flange 12 is to be coupled to a cover-side flange 22, which will be described later, for sealing the tray member 10 and the cover member 20.

Partitioning walls 13 are provided so as to stand in the tray member 10 in the center portion in the longitudinal direction of the tray member 10 for partitioning the tray member 10. The partitioning walls 13 extend in the width direction of the tray member 10, for partitioning the tray member 10 and enhancing the stiffness of the tray member 10. The partitioning walls 13 include a front partitioning wall 13F located on the front side of the vehicle body 2, a rear partitioning wall 13R located on the rear side of the vehicle body 2, and a middle partitioning wall 13C located between the front partitioning wall 13F and the rear partitioning wall 13R, which divide the longitudinal direction of the tray member 10 into four compartments. The term "partitioning walls 13" are used when the front partitioning wall 13F, the middle partitioning wall 13C, and the rear partitioning wall 13R are not specifically distinguished from each other. The partitioning walls 13, which are the walls provided so as to stand in the tray member 10, are also referred to as "standing walls".

Respective sheet metal tray members 40 and battery modules 8, which will be described later, are received in a compartment (hereinafter, referred to as a front battery receiving section) 15F separated by the front wall 11a of the tray member 10 and the front partitioning wall 13F, and a compartment (hereinafter, referred to as a rear battery receiving section) 15R separated by the rear wall 11b of the tray member 10 and the rear partitioning wall 13R. The battery modules 8 are received in a compartment (hereinafter, referred to as a middle battery receiving section) 15C separated by the middle partitioning wall 13C and the rear partitioning wall 13R. Electronic components (not shown) and the like, for detecting the states of the battery modules 8 and controlling the battery modules 8 are received in a compartment (hereinafter, referred to as an electric circuit receiving section) 15E separated by the front partitioning wall 13F and the middle partitioning wall 13C.

Figure 2A:
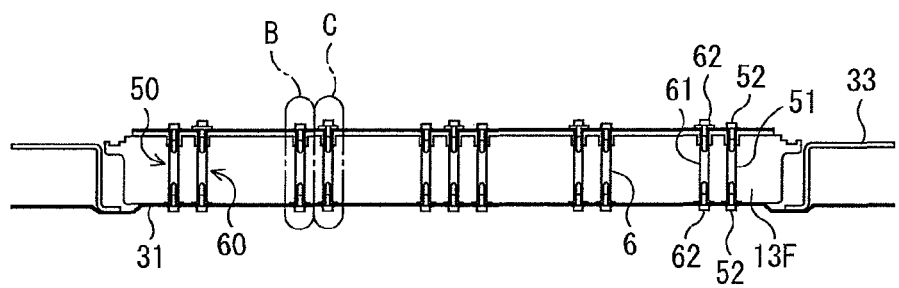
FIG. 2A is a cross-sectional view along Line A-A in FIG. 1.

As shown in FIG. 2A, multiple (11, in this example) tray through holes (through holes) 16 are provided in the front partitioning wall 13F in the width direction of the tray member 10, through the front partitioning wall 13F in the standing direction of the front partitioning wall 13F, i.e., in the vertical direction (upper-lower direction). Similarly, multiple (13, in this example) tray through holes (through holes) 16 are provided in the rear partitioning wall 13R in the width direction of the tray member 10, through the rear partitioning wall 13R in the standing direction of the rear partitioning wall 13R.

Figure 1:
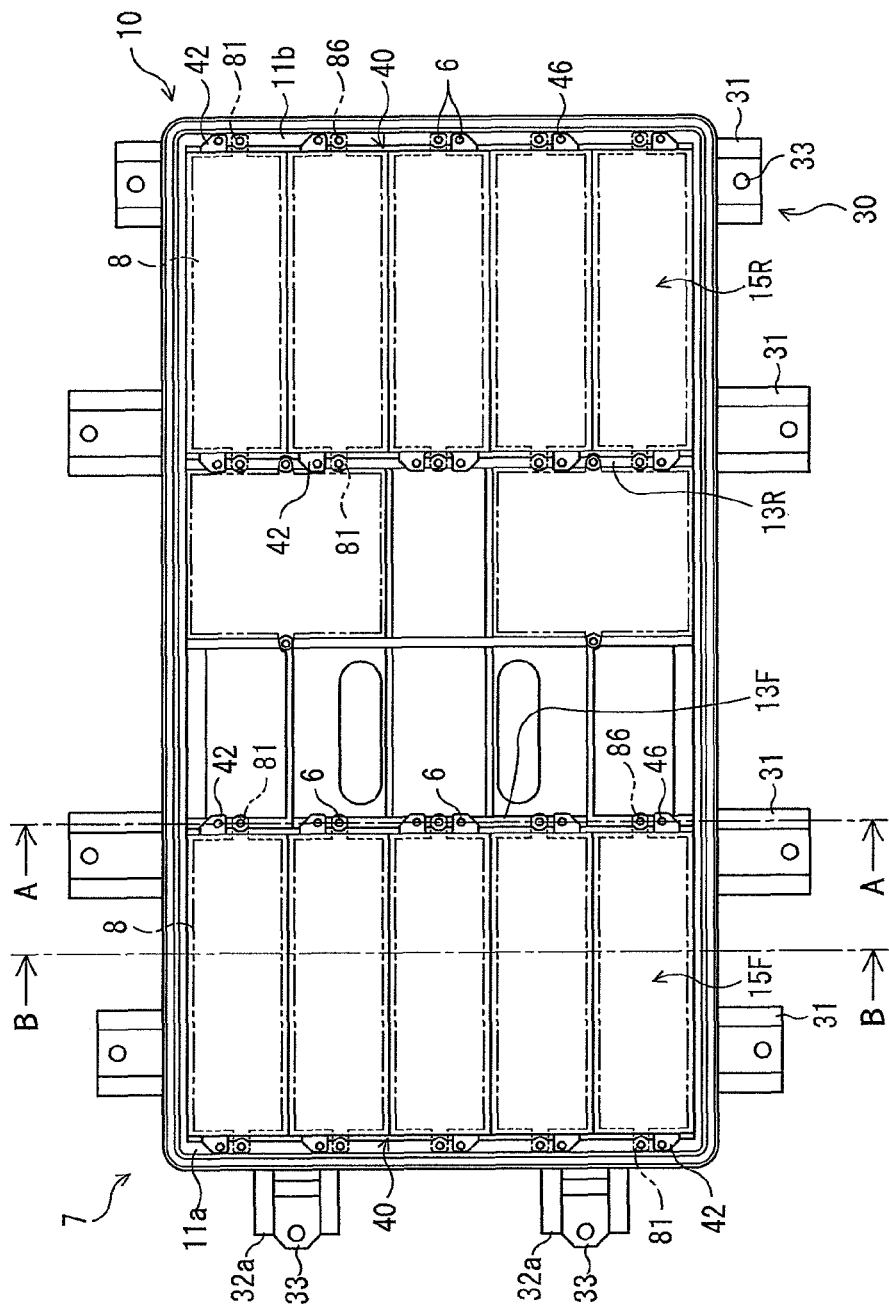
FIG. 1 is a schematic plan view illustrating the structure of a battery casing according to an embodiment.

As shown in FIGS. 1 and 3, the front wall 11a of the tray member 10 includes multiple (ten, in this example) thick portions 17 that are formed thicker so as to protrude inwardly than the front wall 11a and are provided so as to stand from the tray member 10. Tray through holes 16 are provided through these thick portions 17 in the standing direction of the thick portions 17, in the similar manner as the tray through holes 16 provided in the front partitioning wall 13F and the rear partitioning wall 13R. Similarly, the rear wall 11b includes multiple (ten in this example, similar to those in the front wall 11a) thick portions 17 provided so as to stand from the tray member 10, and tray through holes 16 are provided through these thick portions 17.

The tray member 10 having the structure as described above is integrally molded by means of injection molding. The injection molding is a most common resin molding technique, wherein a resin material is molten in a molding machine and the molten resin material is then injected, under a higher pressure, into a die having a shape of the product to be formed and having a cavity and a core. This tray member 10 is formed from a resin material including reinforcing fibers added thereto.

As shown in FIG. 3, the cover member 20 includes a cover main body 21 including a front protruding portion 21a, a rear protruding portion 21b, and a middle protruding portion 21c, and the cover-side flange 22 provided around the periphery of the cover main body 21. Like the tray member 10, the cover member 20 is also integrally molded by means of injection molding.

The battery casing 7 is sealed by coupling the tray member 10 and the cover member 20 together, with a gasket (not shown) inserted between the tray-side flange 12 and the cover-side flange 22. The tray-side flange 12 and the cover-side flange 22 are coupled together with compressively deforming the gasket by means of coupling members (not shown) having multiple bolts and nuts.

The support member 30 is provided under the lower face of the tray member 10 (i.e., the back face of the bottom wall 11e) so as to support the tray member 10 from its bottom. The support member 30 includes multiple (four, in this example) width-direction supports 31 extending in the width direction of the tray member 10, and multiple (two, in this example) longitudinal-direction supports 32 provided so as to extend in the direction perpendicular to the width-direction supports 31 (i.e., the longitudinal direction of the tray member 10) for connecting the width-direction supports 31 together. The width-direction supports 31 and the longitudinal-direction supports 32 are arranged in a so-called well curb.

Multiple support member through holes 36 are formed through the width-direction supports 31 so as to be aligned with the multiple tray through holes 16 formed in the front partitioning wall 13F, the rear partitioning wall 13R, and the thick portions 17 of the tray member 10 once the tray member 10 and the support member 30 are coupled together. The longitudinal-direction supports 32 include front supports 32a protruding forward from the width-direction support (also referred to as "first width-direction support") 31a that is located closest to the front of the vehicle body 2.

As shown in FIG. 1, the ends of the multiple width-direction supports 31 and the front supports 32a of the longitudinal-direction supports 32 protrude outwardly compared to the surrounding wall 11 of the tray member 10. Respective fastening portions 33 are secured to the protruding ends and the front supports 32a. The battery casing 7 is secured to the frame structure by fastening the fastening portions 33 to the frame structure constructing the vehicle body 2.

As shown in FIG. 3, the respective sheet metal tray members 40 are placed on the tray member 10 to be received in the front battery receiving section 15F and the rear battery receiving section 15R of the tray member 10. In this example, the sheet metal tray member 40 received in the front battery receiving section 15F and the sheet metal tray member 40 received in the rear battery receiving section 15R are identical. Therefore, hereinafter, the sheet metal tray member 40 received in the front battery receiving section 15F will be described.

The sheet metal tray member 40 includes a front plate 41a, a rear plate 41b, a bottom plate 41c, and multiple ribs (sheet metal ribs) 41d, defining a box shape having an open top. The front plate 41a is located at the front side of the vehicle body 2 once the sheet metal tray member 40 is received in the tray member 10, while the rear plate 41b is located at the rear side of the vehicle body 2. The front plate 41a and the rear plate 41b are welded to the bottom plate 41c so as to stand, and are formed so as to extend in the width direction of the tray member 10 once the sheet metal tray member 40 is received in the tray member 10.

The multiple ribs 41d are provided so as to extend in the direction perpendicular to the front plate 41a and the rear plate 41b, and are welded to the bottom plate 41c so as to stand. These multiple ribs 41d divide the sheet metal tray member 40 into multiple compartments, as well as enhancing the stiffness of the sheet metal tray member 40. Sheet metal recesses 41 are defined in the sections surrounded by the front plate 41a, the rear plate 41b, the bottom plate 41c, and the multiple ribs 41d. In other words, the sheet metal tray member 40 includes the multiple sheet metal recesses 41 in the sections divided by the multiple ribs 41d. The respective battery modules 8 are received in these sheet metal recesses 41. Here, six ribs 41d are provided in the width direction of the tray member 10, thereby defining five sheet metal recesses 41. The numbers of the ribs 41d and the sheet metal recesses 41 are not limited to those in the above-described embodiment, and the number of the sheet metal recesses 41 can be appropriately modified by adjusted the number of the ribs 41d.

Multiple sheet metal flanges 42 are partially provided at the upper ends of the front plate 41a and the rear plate 41b of the sheet metal tray member 40, so as to protrude outwardly in the horizontal direction from the upper ends. The sheet metal flanges 42 are formed by bending the front plate 41a or the rear plate 41b. As shown in FIG. 1, the sheet metal flanges 42 are formed so as to cover the tray through holes 16 provided in the thick portions 17 and the front partitioning wall 13F of the tray member 10, once the sheet metal tray member 40 is received in the front battery receiving section 15F. Multiple sheet metal tray through holes 46 are formed through the sheet metal flanges 42 so as to be aligned with the tray through holes 16, once the sheet metal tray member 40 is received in the front battery receiving section 15F.

Next, a characteristic structure of this battery casing 7 will be described.

As shown in FIG. 1, the support member 30 is provided under the lower face of the tray member 10, and the respective sheet metal tray members 40 are placed in the front battery receiving section 15F and the rear battery receiving section 15R. On the sheet metal tray members 40, the battery modules 8 are received in the compartments divided by the ribs 41d extending in the longitudinal direction of the tray member 10.

The sheet metal tray member 40 placed in the front battery receiving section 15F is placed such that the front plate 41a becomes parallel to the front wall 11a of the tray member 10 and the rear plate 41b becomes parallel to the front partitioning wall 13F, and the bottom plate 41c is stacked on the bottom wall 11e of the tray member 10. Furthermore, the sheet metal flanges 42 on the front plate 41a side are placed on the upper faces of the thick portions 17 of the front wall 11a, while the sheet metal flanges 42 on the rear plate 41b side are placed on the upper face of the front partitioning wall 13F.

Similarly, the sheet metal tray member 40 placed in the rear battery receiving section 15R is placed such that the front plate 41a becomes parallel to the rear partitioning wall 13R and the rear plate 41b becomes parallel to the rear wall 11b of the tray member 10, and the bottom plate 41c is stacked on the bottom wall 11e of the tray member 10. Furthermore, the sheet metal flanges 42 on the front plate 41a side are placed on the upper face of the rear partitioning wall 13R, while the sheet metal flanges 42 on the rear plate 41b side are placed on the upper faces of the thick portions 17 of the rear wall 11b. Note that the front plate 41a and the rear plate 41b of the sheet metal tray member 40 are provided so as to stand substantially with the same height as those of the front wall 11a, the rear wall 11b, the front partitioning wall 13F, and the rear partitioning wall 13R which are standing walls provided so as to stand in the tray member 10.

As shown in FIG. 3, the support member 30 provided under the lower face of the tray member 10 is placed such that four width-direction supports 31 have lengths in the front-rear direction sufficiently longer than the thicknesses of the front wall 11a, the front partitioning wall 13F, the rear partitioning wall 13R, and the rear wall 11b of the tray member 10 and arranged right under the front wall 11a, the front partitioning wall 13F, the rear partitioning wall 13R, and the rear wall 11b of the tray member 10, in this order of closeness to the front of the vehicle body 2. In other words, as shown in FIG. 1, the width-direction supports 31 are provided such that the front wall 11a, the front partitioning wall 13F, the rear partitioning wall 13R, and the rear wall 11b are overlapped with portions of the width-direction supports 31, when viewed from the top.

Figure 2B:
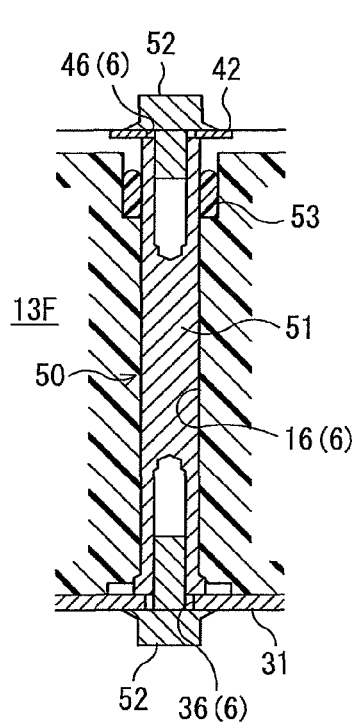
FIG. 2B is an enlarged cross-sectional view of Portion B in FIG. 2A.

The relationship among the width-direction supports 31 of the support member 30; the front wall 11a, the front partitioning wall 13F, the rear partitioning wall 13R, and the rear wall 11b, which are standing walls of the tray member 10; and the sheet metal flanges 42 of the sheet metal tray member 40 will be described with reference to FIGS. 2A to 2C. Although FIG. 2A is a cross-sectional view of the front partitioning wall 13F of the tray member 10 in the extending direction of the front partitioning wall 13F, the other standing walls of the tray member 10 have similar structures. FIG. 2B is an enlarged cross-sectional view of the Portion B in FIG. 2A, while FIG. 2C is an enlarged cross-sectional view of the Portion C in FIG. 2A.

Figure 2C:
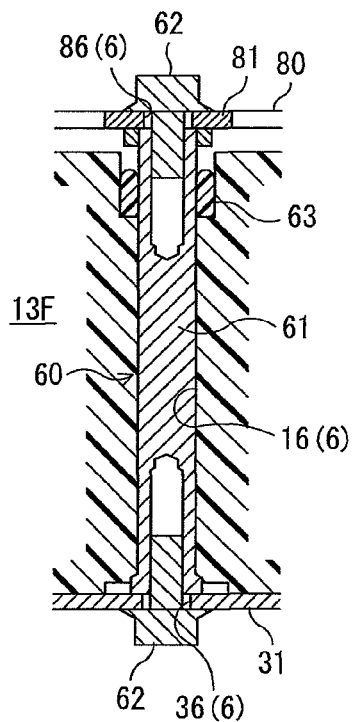
FIG. 2C is an enlarged cross-sectional view of Portion C in FIG. 2A.

As shown in FIGS. 2A to 2C, a tray through hole 16 formed in the front partitioning wall 13F, a sheet metal tray through hole 46 formed in a sheet metal flange 42, and a support member through hole 36 formed in a width-direction support 31 of the support member 30 are to be aligned into a straight line in the vertical direction, defining a single through hole 6. Similarly, a tray through hole 16, a battery through hole 86 which will be described later, and a support member through hole 36 are to be aligned into a straight line in the vertical direction, defining a single through hole 6.

This through hole 6 is provided with a sheet metal fastening member 50 for fastening the width-direction support 31 of the support member 30 and the sheet metal flange 42 of the sheet metal tray member 40 to the front partitioning wall 13F, or a battery fastening member 60 for fastening the width-direction support 31 and the battery modules 8 to the front partitioning wall 13F. Note that a battery module 8 includes a battery attachment bracket 80 fastened thereto, and the battery attachment bracket 80 is provided with a flange (hereinafter, referred to as a battery flange) 81 for fastening the battery module 8 to the front partitioning wall 13F. As shown with the chain double-dashed lines in FIG. 1, this battery flange 81 is placed on the upper face of the front partitioning wall 13F. Furthermore, the battery flange 81 has the battery through hole 86 formed therein.

A sheet metal fastening member 50 includes a through nut 51 inserted into the through hole 6, and two bolts 52 screwed with the through nut 51. Furthermore, a sealing material 53 is inserted between the upper end of the front partitioning wall 13F and the sheet metal flange 42. Similarly, a battery fastening member 60 includes a through nut 61 inserted into the through hole 6, and two bolts 62 screwed with the through nut 61. A sealing material 63 is inserted between the upper end of the front partitioning wall 13F and the battery flange 81. Here, the sheet metal fastening member 50 and the battery fastening member 60 have the identical parts. In other words, the through nuts 51 and 61, the bolts 52 and 62, and the sealing materials 53 and 63 are identical, respectively.

The sheet metal flange 42 is fastened to the width-direction support 31 by the sheet metal fastening member 50 provided through the through hole 6, sandwiching the front partitioning wall 13F of the tray member 10. In other words, the sheet metal fastening member 50 fastens the support member 30 and the sheet metal flange 42 to the front partitioning wall 13F, i.e., the tray member 10, once one of the bolts 52 is screwed with the through nut 51 from the top of the sheet metal flange 42 placed on the upper face of the front partitioning wall 13F and the other bolt 52 is screwed with the through nut 51 from the bottom of the width-direction support 31 of the support member 30 placed on the lower face of the tray member 10.

Furthermore, the battery module 8 is fastened to the width-direction support 31 by the battery fastening member 60 provided through the through hole 6, sandwiching the front partitioning wall 13F. In other words, the battery fastening member 60 fastens the support member 30 and the battery flange 81 to the front partitioning wall 13F, i.e., the tray member 10, once one of the bolts 62 is screwed with the through nut 61 from the top of the battery flange 81 placed on the upper face of the front partitioning wall 13F and the other bolt 62 is screwed with the through nut 61 from the bottom of the width-direction support 31 of the support member 30 placed on the lower face of the tray member 10.

A sheet metal fastening member 50 and a battery fastening member 60 are arranged side by side on each standing wall of the tray member 10. In other words, as shown in FIG. 1, a sheet metal flange 42 and a battery flange 81 are provided adjacent to each other without being overlapped, and the sheet metal flange 42 of the sheet metal tray member 40 and the battery flange 81 of the battery module 8 are not fastened by any fastening member. The term "side by side" as used herein means that a sheet metal tray through hole 46 provided in a sheet metal flange 42 and a battery through hole 86 provided in a battery flange 81 are provided adjacent to each other without being overlapped.

For the battery casing 7 according to the present embodiment constructed as described above, the support member 30, the sheet metal tray member 40, the battery modules 8, and the cover member 20 are coupled and secured to the tray member 10 in the following manner.

Through nuts 51 and 61 are inserted into the tray through holes 16 provided through the front wall 11a, the rear wall 11b, the front partitioning wall 13F, and the rear partitioning wall 13R, which are the standing walls of the tray member 10. Respective sheet metal tray members 40 are placed in the front battery receiving section 15F and the rear battery receiving section 15R of the tray member 10. In this step, the sheet metal flanges 42 of the sheet metal tray member 40 are placed such that the sheet metal tray through holes 46 formed in the sheet metal flanges 42 and the tray through holes 16 provided in each standing wall are aligned with an upper face of each standing wall of the tray member 10. Sealing materials 53 are inserted between the sheet metal flanges 42 and the upper end of each standing wall.

The support member 30 is placed below the lower face of the tray member 10 such that the width-direction supports 31 extend in the width direction of the tray member 10, and are located right under the front wall 11a, the rear wall 11b, the front partitioning wall 13F, and the rear partitioning wall 13R of the tray member 10. In this process, the support member through holes 36 formed in the width-direction supports 31 are aligned with the tray through holes 16 provided in each standing wall of the tray member 10.

Then, the bolts 52 are screwed with the through nuts 51 from the top and the bottom to fasten the width-direction supports 31 of the support member 30 and the sheet metal flanges 42 of the sheet metal tray member 40, sandwiching each standing wall of the tray member 10.

The battery modules 8 are received in the sheet metal recesses 41 in the sheet metal tray member 40. In this process, the battery flanges 81 are positioned such that the battery through holes 86 and the tray through holes 16 are aligned with each standing wall of the tray member 10. Sealing materials 63 are inserted between the battery flanges 81 and the upper end of each standing wall. Then, the bolts 62 are screwed with the through nuts 61 from the top and the bottom to fasten the width-direction supports 31 of the support member 30 and the battery flanges 81, sandwiching each standing wall of the tray member 10.

The cover member 20 is stacked on the top of the tray member 10 constructed as described above, and the battery casing 7 is sealed by coupling the tray-side flange 12 and the cover-side flange 22 with coupling members having multiple bolts and nuts. Therefore, according to this battery casing 7, the sheet metal tray members 40 are placed on the resin tray member 10 that supports the battery module 8. The sheet metal flanges 42 are provided on the upper faces of the front wall 11a, the rear wall 11b, the front partitioning wall 13F, and the rear partitioning wall 13R provided so as to stand from the tray member 10, and the support member 30 is provided under the lower face of the tray member 10. In other words, the standing walls of the tray member 10 are sandwiched between the sheet metal flanges 42 and the support member 30, and the sheet metal flanges 42 and the support member 30 are fastened to the tray member 10 by the sheet metal fastening members 50. Accordingly, the stiffness of each standing wall is enhanced, thereby enhancing the stiffness of the battery casing 7 as a whole.

Stating differently, the sheet metal flanges 42 of the sheet metal tray members 40 are provided to the upper faces of the standing walls of the resin tray member 10, in addition to the lower faces, and the standing walls are fastened by sandwiching the standing walls between the upper sheet metal flanges 42 and the lower support member 30. This prevents elastic deformation of the standing walls, thereby enhancing the stiffness of the standing walls. This results in an enhanced stiffness of the battery casing 7 as a whole.

Furthermore, enhancement of the stiffness of the standing walls can also help to reduce the thicknesses of the standing walls provided so as to stand on the tray member 10. In other words, the reduced stiffness of thinner standing walls can be compensated for by the sheet metal flanges 42 and the support member 30. Thus, the thinner standing walls help to increase the space for receiving the battery module 8. This means that larger battery modules 8 can be accommodated in the battery casing 7 without increasing its size.

Furthermore, by enhancing the stiffness of the front partitioning wall 13F and the rear partitioning wall 13R extending in the width direction of the tray member 10, it is possible to provide rigid portions at the center portion in the longitudinal direction of the tray member 10. Therefore, the stiffness of the battery casing 7 as a whole can be efficiently enhanced. Similarly, the stiffness of the battery casing 7 as a whole can also be efficiently improved by enhancing the stiffness of the front wall 11a and the rear wall 11b, which are surrounding walls 11 of the tray member 10 extending in the width direction.

Figure 4A:
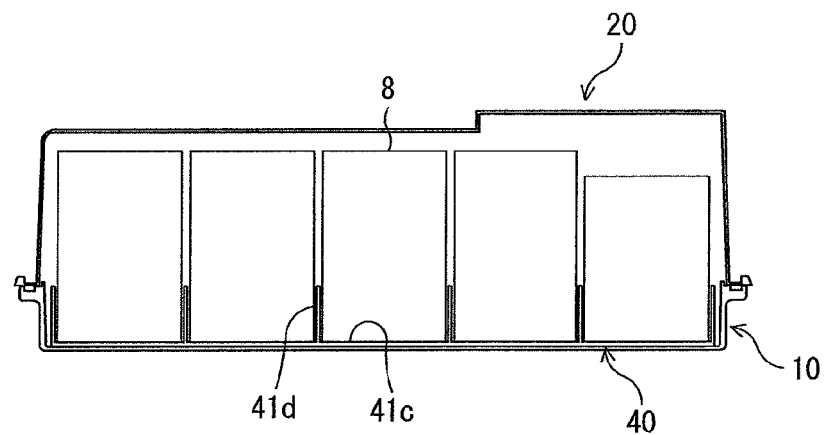
FIG. 4A is a cross-sectional view along Line B-B in FIG. 1.
Figure 4B:
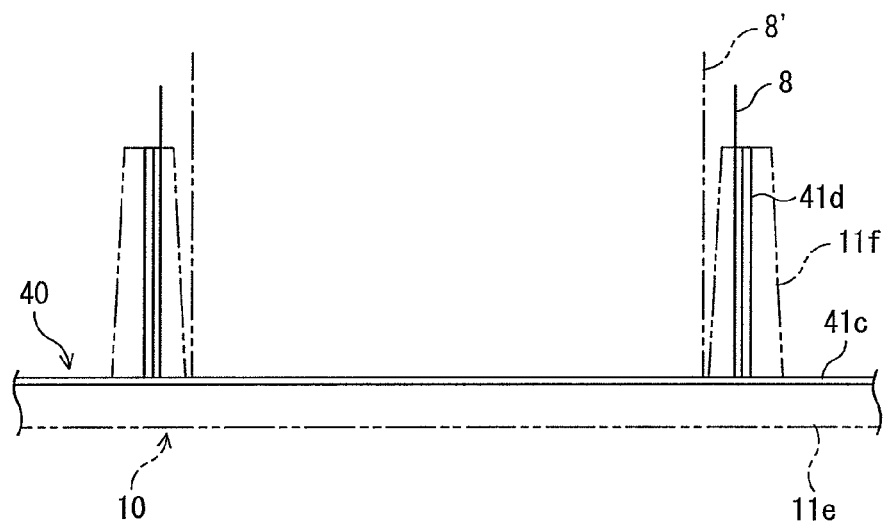
FIG. 4B is a partial enlarged view of FIG. 4A.

Furthermore, since the sheet metal tray members 40 are placed on the resin tray member 10, the stiffness of the tray member 10 can be further enhanced, not only by the sheet metal flanges 42 but also by the ribs 41d of the sheet metal tray members 40. Furthermore, as shown in FIGS. 4A and 4B, the ribs 41d made from sheet metals are thinner than ribs 11f made from a resin. Accordingly, as shown with the chain double-dashed lines in FIG. 4B, since resin ribs 11f are bulky, battery modules 8' to be accommodated therein are restricted to smaller ones. In contrast, as shown with the solid lines in FIG. 4B, ribs 41d made from sheet metals allows larger battery modules 8 to be accommodated. This means that the space efficiency can be improved, while enhancing the stiffness of the tray member 10.

Furthermore, the sheet metal fastening members 50 and the battery fastening members 60 include the through nuts 51 and 61 and the bolts 52 and 62, respectively, and are fasten to the tray member 10, once the bolts 52 and 62 are screwed with the through nuts 51 and 61 from the top and the bottom. Accordingly, the same parts can be used for fastening of both the sheet metal tray members 40 and the battery module 8, which simplifies the structure and also reduces cost increase. Furthermore, the sheet metal flanges 42 and the battery flanges 81 placed on the upper faces of the standing walls of the tray member 10 and the width-direction supports 31 of the support member 30 can be easily and reliably fastened to the tray member 10.

Generally, since batteries used for driving an electric vehicle require higher outputs, their capacities tend to be increased, as compared to other batteries (such as batteries for auxiliary machines of the vehicle). Such larger-capacity batteries tend to generate stronger electromagnetic waves than other batteries. A battery casing only made from a resin tray member would not shield electromagnetic waves generated by the batteries. In contrast, the battery casing 7 according to the present invention includes sheet metal tray members 40 and is able to shield electromagnetic waves. Accordingly, disadvantages can be reduced, such as noise in in-vehicle radio caused by electromagnetic waves from the batteries.

Furthermore, the battery casing 7 according to the present invention is more suitable as a casing for larger-capacity batteries since the stiffness is enhanced and space for receiving the batteries is increased.

Although an embodiment of the present invention has been described, the present invention is not limited to the embodiment described above and various modifications may be made without departing from the spirit of the present invention.

Although the support member 30 is formed in a well curb configuration in the above-described embodiment, the support member 30 is not limited to this structure. For example, the longitudinal-direction supports 32 may be provided partially. The configuration is not limited to the well curb, and any structure is possible, as long as the load of the entire battery casing 7 can be supported.

Furthermore, the shapes of the tray member 10 and the cover member 20 in the above-described embodiment are not limited, and the tray member 10 and the cover member 20 may have any other shapes which do not have a longitudinal direction, such as a square shape, for example. Furthermore, the partitioning walls 13 in the tray member 10 may be located differently, and the positions of the battery receiving sections 15F, 15C, and 15R and the electric circuit receiving section 15E may be modified accordingly.

Furthermore, unlike the above-described embodiment, the sheet metal tray members 40 may not have identical sizes, since the sizes of sheet metal tray members 40 are determined by the sizes of the front battery receiving section 15F and the rear battery receiving section 15R.

Furthermore, the sizes and the numbers of the sheet metal flanges 42 and the battery flanges 81 are not limited to those in the above-described embodiment. The sheet metal flanges 42 and the battery flanges 81 may be partially overlapped, as long as the sheet metal tray through holes 46 and the battery through holes 86 are not overlapped.

Furthermore, the numbers of the through holes 6 provided in the standing walls and the like are not limited to those in the above-described embodiment. In other words, at least three through holes 6 (i.e., two at the ends and one at the center of the sheet metal flanges 42) are required for fastening the sheet metal flanges 42 of the sheet metal tray members 40. This number can be suitably adjusted in accordance with the length of the sheet metal flanges 42. Furthermore, the number of through holes 6 for securing the battery module 8 is determined by the number of the battery module 8 to be received in the tray member 10.

Furthermore, the sheet metal fastening members 50 and the battery fastening members 60 may not be constructed from the through nuts 51 and 61 and the bolts 52 and 62. For example, the sheet metal fastening members 50 and the battery fastening members 60 may be constructed from bolts longer than the through holes 6 and weld nuts, or may be constructed from through bolts and nuts. Furthermore, the sheet metal fastening members 50 and the battery fastening members 60 may have different configurations, or may not be arranged side by side.

REFERENCE SIGNS LIST

6 THROUGH-HOLE
7 BATTERY CASING
8 BATTERY MODULE (BATTERY)
10 TRAY MEMBER
11 SURROUNDING WALL (STANDING WALL)
11a FRONT WALL (STANDING WALL)
11b REAR WALL (STANDING WALL)
13 PARTITIONING WALL (STANDING WALL)
13F FRONT PARTITIONING WALL (STANDING WALL)
13R REAR PARTITIONING WALL (STANDING WALL)
16 TRAY THROUGH-HOLE (THROUGH-HOLE)
20 COVER MEMBER
30 SUPPORT MEMBER
31 WIDTH-DIRECTION SUPPORT
40 SHEET METAL TRAY MEMBER
41 SHEET METAL RECESS
42 SHEET METAL FLANGE
50 SHEET METAL FASTENING MEMBER
51 THROUGH NUT
52 BOLT
60 BATTERY FASTENING MEMBER
61 THROUGH NUT
62 BOLT
81 BATTERY FLANGE

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A battery casing for receiving a battery for driving an electric vehicle comprising:
    a tray member made from a resin and supporting the battery;
    a support member provided under a lower face of the tray member and supporting the tray member from a bottom thereof;
    a standing wall provided so as to stand in the tray member; and
    a sheet metal tray member made from a sheet metal, including a front plate, a rear plate, a bottom plate, and multiple ribs, and placed on the tray member,
    wherein the sheet metal tray member comprises a plurality of sheet metal recesses, defined in the section surrounded by the front plate, the rear plate, the bottom plate, and the multiple ribs, that receive the battery and a sheet metal flange protruding outwardly in a horizontal direction from an upper end of the front plate and the rear plate, and placed on an upper face of the standing wall, the bottom plate receiving a bottom of the battery,
    the standing wall comprises a through hole formed through the standing wall in a standing direction of the standing wall,
    the support member and the sheet metal flange are fastened to the tray member by means of a sheet metal fastening member provided through the through hole,
    the bottom plate of the sheet metal tray member is made of the sheet metal, and
    the sheet metal tray member is made of a single piece member.

2. The battery casing according to claim 1, wherein the standing wall is a partitioning wall extending in a transverse direction of the tray member and provided in a center portion in the longitudinal direction, or a surrounding wall at an end in the longitudinal direction of the tray member.

3. The battery casing according to claim 1, wherein the battery comprises a battery flange placed on the upper face of the standing wall,
    the support member and the battery flange are fastened to the tray member by means of a battery fastening member provided through the through hole, and
    the sheet metal fastening member and the battery fastening member are arranged side by side.

4. The battery casing according to claim 2, wherein the battery comprises a battery flange placed on the upper face of the standing wall, the support member and the battery flange are fastened to the tray member by means of a battery fastening member provided through the through hole, and the sheet metal fastening member and the battery fastening member are arranged side by side.

5. The battery casing according to claim 3, wherein the sheet metal fastening member and the battery fastening member each include a through nut inserted in the through hole and a bolt, and the support member and the sheet metal flange, and the support member and the battery flange are fastened to the tray member once the bolt is screwed with the through nut from the upper face of the standing wall and the lower face of the tray member.

6. The battery casing according to claim 4, wherein the sheet metal fastening member and the battery fastening member each include a through nut inserted in the through hole and a bolt, and the support member and the sheet metal flange, and the support member and the battery flange are fastened to the tray member once the bolt is screwed with the through nut from the upper face of the standing wall and the lower face of the tray member.

7. A battery casing for receiving a battery for driving an electric vehicle comprising:

a tray member made from a resin and supporting the battery;

a support member provided under a lower face of the tray member and supporting the tray member from a bottom thereof;

a standing wall provided so as to stand in the tray member; and a sheet metal tray member made from a sheet metal and placed on the tray member, wherein the sheet metal tray member comprises a plurality of sheet metal recesses, including a bottom plate, that receive the battery and a sheet metal flange protruding outwardly in a horizontal direction from an upper end of the front plate and the rear plate, and placed on an upper face of the standing wall, the bottom plate receiving a bottom of the battery, the standing wall comprises a through hole formed through the standing wall in a standing direction of the standing wall, and the support member and the sheet metal flange are fastened to the tray member by means of a sheet metal fastening member provided through the through hole.

wherein the battery comprises a battery flange placed on the upper face of the standing wall, the support member and the battery flange are fastened to the tray member by means of a battery fastening member provided through the through hole, and the sheet metal fastening member and the battery fastening member are arranged side by side, and wherein the sheet metal fastening member and the battery fastening member each include a through nut inserted in the through hole and a bolt, the support member and the sheet metal flange, and the support member and the battery flange are fastened to the tray member once the bolt is screwed with the through nut from the upper face of the standing wall and the lower face of the tray member, the bottom plate of the sheet metal tray member is made of the sheet metal, and the sheet metal tray member is made of a single piece member.

8. A battery casing for receiving a battery for driving an electric vehicle comprising:

a tray member made from a resin and supporting the battery;

a support member provided under a lower face of the tray member and supporting the tray member from a bottom thereof;

a standing wall provided so as to stand in the tray member; and a sheet metal tray member made from a sheet metal and placed on the tray member, wherein the sheet metal tray member comprises a plurality of sheet metal recesses, including a bottom plate, that receive the battery and a sheet metal flange protruding outwardly in a horizontal direction from an upper end of the front plate and the rear plate, and placed on an upper face of the standing wall, the bottom plate receiving a bottom of the battery, the standing wall comprises a through hole formed through the standing wall in a standing direction of the standing wall, and the support member and the sheet metal flange are fastened to the tray member by means of a sheet metal fastening member provided through the through hole, wherein the standing wall is a partitioning wall extending in a transverse direction of the tray member and provided in a center portion in the longitudinal direction, or a surrounding wall at an end in the longitudinal direction of the tray member, the support member and the battery flange are fastened to the tray member by means of a battery fastening member provided through the through hole, the sheet metal fastening member and the battery fastening member are arranged side by side, the sheet metal fastening member and the battery fastening member each include a through nut inserted in the through hole and a bolt, the support member and the sheet metal flange, and the support member and the battery flange are fastened to the tray member once the bolt is screwed with the through nut from the upper face of the standing wall and the lower face of the tray member, the bottom plate of the sheet metal tray member is made of the sheet metal, and the sheet metal tray member is made of a single piece member.

* * * * *